(12) United States Patent
Bathala et al.

(10) Patent No.: US 12,138,812 B2
(45) Date of Patent: Nov. 12, 2024

(54) SYSTEMS AND METHODS FOR LASER AND IMAGING ODOMETRY FOR AUTONOMOUS ROBOTS

(71) Applicant: Brain Corporation, San Diego, CA (US)

(72) Inventors: Girish Bathala, San Diego, CA (US); Sahil Dhayalkar, San Diego, CA (US); Kirill Pirozhenko, San Diego, CA (US); Oleg Sinyavskiy, San Diego, CA (US)

(73) Assignee: Brain Corporation, San Diego, CA (US)

( * ) Notice: Subject to any disclaimer, the term of this patent is extended or adjusted under 35 U.S.C. 154(b) by 485 days.

(21) Appl. No.: 17/386,001

(22) Filed: Jul. 27, 2021

(65) Prior Publication Data

US 2021/0354302 A1    Nov. 18, 2021

Related U.S. Application Data

(63) Continuation of application No. PCT/US2020/016070, filed on Jan. 31, 2020.

(Continued)

(51) Int. Cl.
*B25J 9/16*    (2006.01)
*B25J 13/08*    (2006.01)
(Continued)

(52) U.S. Cl.
CPC ........... *B25J 9/1697* (2013.01); *B25J 9/1664* (2013.01); *B25J 13/089* (2013.01); *G06T 7/20* (2013.01);

(Continued)

(58) Field of Classification Search
CPC ..... G05D 1/0251; B25J 9/1697; B25J 9/1664; B25J 13/089; G06T 7/579; G06T 7/70;
(Continued)

(56) References Cited

U.S. PATENT DOCUMENTS

2013/0226344 A1    8/2013    Wong et al.
2016/0014426 A1    1/2016    Richert
(Continued)

OTHER PUBLICATIONS

International Search Report and Written Opinion dated Apr. 29, 2020 for PCT/US20/16070.
(Continued)

*Primary Examiner* — Jason Holloway
*Assistant Examiner* — Christopher A Buksa
(74) *Attorney, Agent, or Firm* — Pierson Ferdinand LLP; Sidharth Kapoor

(57) ABSTRACT

Systems and methods for laser and imaging odometry for autonomous robots are disclosed herein. According to at least one non-limiting exemplary embodiment, a robot may utilize images captured by a sensor and encoded with a depth parameter to determine its motion and localize itself. The determined motion and localization may then be utilized to verify calibration of the sensor based on a comparison between motion and localization data based on the images and motion and localization data based on data from other sensors and odometry units of the robot.

16 Claims, 7 Drawing Sheets

Related U.S. Application Data

(60) Provisional application No. 62/799,142, filed on Jan. 31, 2019.

(51) Int. Cl.
*G06T 7/20* (2017.01)
*G06T 7/579* (2017.01)
*G06T 7/70* (2017.01)

(52) U.S. Cl.
CPC ............. *G06T 7/579* (2017.01); *G06T 7/70* (2017.01); *G06T 2207/20221* (2013.01); *G06T 2207/30241* (2013.01)

(58) Field of Classification Search
CPC ............ G06T 7/20; G06T 2207/20221; G06T 2207/30241
See application file for complete search history.

(56) References Cited

U.S. PATENT DOCUMENTS

| 2016/0128783 | A1 | 5/2016 | Hladio et al. |
| 2016/0227193 | A1 | 8/2016 | Osterwood et al. |
| 2017/0277197 | A1* | 9/2017 | Liao ............... G06T 7/20 |
| 2017/0334066 | A1 | 11/2017 | Levine et al. |
| 2018/0150972 | A1 | 5/2018 | Zhu |
| 2020/0164508 | A1* | 5/2020 | Pajovic ............ B25J 9/0084 |

OTHER PUBLICATIONS

Supplemental European Search Report for Application No. 20748214.2 dated Sep. 29, 2022.

Kerl et al., "Dense visual SLAM for RGB-D cameras", 2013 IEEE/RSJ International Conference on Intelligent Robots and Systems (ROS), IEEE, Nov. 3, 2013 (Nov. 3, 2013), pp. 2100-2106, XP032537192, ISSN: 2153-0858, DOI: 10.1109/IROS.2013.6696650 [retrieved on Dec. 26, 2013] *abstract, Figs. 1-4, sections I-VI*.

Taketomi et al: "Visual SLAM algorithms: a survey from 2010 to 2016", IPSJ Transactions on Computer Vision and Applications, vol. 9, No. 1, Dec. 2017 (Dec. 2017 ), XP055468667, ISSN: 1882-7772, DOI: 10.1186/s41074-017-0027-2 *abstract; sections 6, 7.1, 8; Table 1*.

* cited by examiner

SYSTEMS AND METHODS FOR LASER AND IMAGING ODOMETRY FOR AUTONOMOUS ROBOTS

PRIORITY

This application is a continuation of International Patent Application No. PCT/US20/16070 filed Jan. 31, 2020 and claims the benefit of U.S. Provisional Patent Application Ser. No. 62/799,142 filed on Jan. 31, 2019 under 35 U.S.C. § 119, the entire disclosure of each are incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application relates generally to robotics, and more specifically to systems and methods for laser and imaging odometry for autonomous robots.

Background

Currently, many robots may comprise at least one sensor capable of measuring distance to an object within a visual scene. These sensors may be essential for a robot to operate effectively and safely within complex environments and therefore require accurate calibration. Calibration of these sensors may, however, degrade over time due to natural wear and tear, collisions with objects, temperature fluctuations, and the like.

Additionally, many robots may comprise, for example, odometers and gyroscopes used to measure distance traveled and motion of the robot. These odometers and gyroscopes may comprise biases and noise and may therefore become unreliable to generate accurate data used to recreate a motion of the robot by themselves.

To ensure the calibration of these sensors is sufficient for safe and effective operation of the robot, an operator may be required to occasionally verify the calibration of the sensors. This may be time consuming and impractical for many situations. Accordingly, there is a need in the art for systems and methods for laser and imaging odometry for autonomous robots such that robots may utilize data from these sensors to determine any extrinsic biases of the sensors to ensure accurate calibration of the sensors and enable robots to enhance localization capabilities by reducing reliance on classical odometry units (e.g., gyroscopes, accelerometers, etc.).

SUMMARY

The foregoing needs are satisfied by the present disclosure, which provides for, inter alia, systems and methods for laser and imaging odometry for autonomous robots.

Exemplary embodiments described herein have innovative features, no single one of which is indispensable or solely responsible for their desirable attributes. Without limiting the scope of the claims, some of the advantageous features will now be summarized.

According to at least one non-limiting exemplary embodiment, a method for determining a pose of a sensor on a robot is disclosed. The method may comprise a controller of the robot determining a first motion of the robot based on a change in pose of the sensor, the change in pose of the sensor being determined based on an image discrepancy between at least two images captured by the sensor at separate times; determining a second motion of the robot based on data from at least one other sensor and odometry unit; and determining the pose of the sensor based on a motion discrepancy between the first motion and the second motion. The method may further comprise capturing a first image at a first time and a second image at a second time using the sensor, the first and second images comprising pixels of at least one target object; determining the image discrepancy by translating and rotating the second image such that the translated and rotated second image matches the first image; and determining the change in pose of the sensor based on the translations and rotations performed on the second image.

The sensor being mounted on the robot in a fixed pose and configured to measure at least a depth parameter of objects within a visual scene of the robot and produce images encoded with the depth parameter. The method may further comprise the robot localizing itself based on the determined change in pose of the sensor corresponding to a change in pose of the robot, the change in pose of the sensor corresponding to the rotations and translations performed on the second image.

According to at least one non-limiting exemplary embodiment, a robotic system is disclosed. The robotic system may comprise a non-transitory computer readable storage medium comprising a plurality of instructions embodied thereon and controller or a specialized processor configured to execute the instructions to: determine a first motion of a robot based on a change in pose of a sensor, the change in pose of the sensor being determined based on an image discrepancy between at least two images captured by the sensor at separate times; determine a second motion of the robot based on data from at least one other sensor and odometry unit; and determine the pose of the sensor based on a motion discrepancy between the first motion and the second motion of the robot. The controller or specialized processor of the robotic system may further be configurable to capture a first image using the sensor at a first time and capturing a second image at a second time, the first image and the second image comprising at least in part pixels of at least one object; determine the image discrepancy by translating and rotating the second image such that the translated and rotated second image matches the first image; and determine the change in pose of the sensor based on the translations and rotations performed on the second image. The sensor being mounted on the robot in a fixed pose and configured to measure at least a depth parameter of objects within a visual scene and produce images encoded with the depth parameter. The controller or specialized processor may further be configurable to localize the robot based on the determined change in pose of the sensor corresponding to a change in pose of the robot, the change in pose of the sensor corresponding to the rotations and translations performed on the second image. One skilled in the art may appreciate that reference to processor may equivalently correspond to processing device as set forth herein.

The inventive concepts disclosed are performed by features in specific and particular configuration that make non-abstract improvements to computer technology and functionality. Some of these improvements in computer technology and functionality include executing specialized algorithm by unique and specialized processor(s) or controller(s) that allow the processing device or controller to perform faster and more efficiently than conventional processor(s); and requires usage of less memory space as data is collected, analyzed and stored therein. The inventive concepts are integrated into a practical application of maneuvering a robotic device, which solves problems identified in the prior art and provides benefit and improvement over the same. Accordingly, the inventive concepts disclosed herein are an improvement over the conventional technology or prior art directed to maneuvering a robot along a trajectory that is prone to safety risks to itself, humans and objects around it. Lastly, structural components disclosed herein, such as, for example, various sensor units, navigation units, actuator units, communication units and user interface units, are oriented in a specific manner and configuration that is unique to the functioning and operation of the robotic device as it maneuvers along a path.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a," "an," and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

Figure 1A:
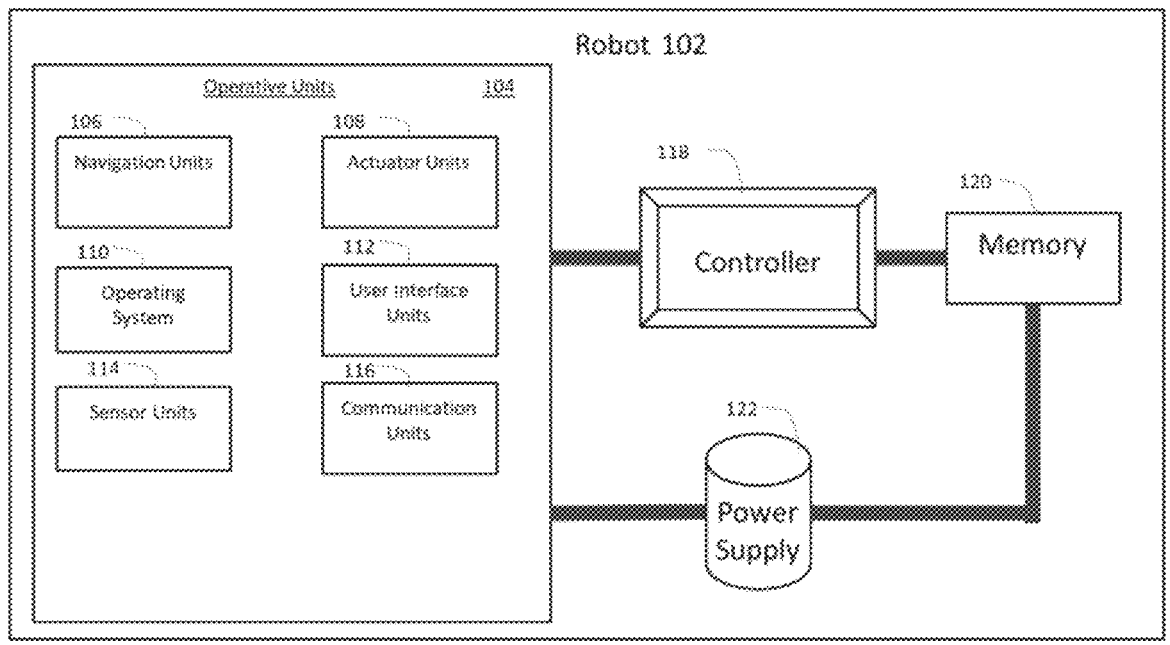
FIG. 1A is a functional block diagram of a main robot in accordance with some embodiments of this disclosure.

All Figures disclosed herein are © Copyright 2018 Brain Corporation. All rights reserved.

DETAILED DESCRIPTION

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for systems and methods for laser and imaging odometry for autonomous robots. As used herein, a robot may include mechanical and/or virtual entities configured to carry out a complex series of tasks or actions autonomously. In some exemplary embodiments, robots may be machines that are guided and/or instructed by computer programs and/or electronic circuitry. In some exemplary embodiments, robots may include electro-mechanical components that are configured for navigation, where the robot may move from one location to another. Such robots may include autonomous and/or semi-autonomous cars, floor cleaners, rovers, drones, planes, boats, carts, trams, wheelchairs, industrial equipment, stocking machines, mobile platforms, personal transportation devices (e.g., hover boards, SEGWAYS®, etc.), stocking machines, trailer movers, vehicles, and the like. Robots may also include any autonomous and/or semi-autonomous machine for transporting items, people, animals, cargo, freight, objects, luggage, and/or anything desirable from one location to another.

As used herein, a depth image may comprise a plurality of pixels, each pixel being encoded with a depth value corresponding to a distance between a sensor used to capture the depth image and the point represented by the pixel within the image. In some instances, color parameters (e.g., RGB or greyscale) may additionally be encoded in a depth image. Depth images may be captured using depth cameras, LiDAR sensors, RGB cameras in conjunction with specialized image processing algorithms, and the like.

As used herein, a pose of a camera, robot, or object may refer to its (x, y, z) position relative to an origin point. A pose may further comprise orientation, e.g., yaw, pitch, and roll angles. In some instances, only some pose parameters may be defined and/or utilized by, for example, a robot localizing itself or objects. For example, a robot operating on a 2D plane (e.g., a wheeled robot operating on a floor) may localize its pose with respect to (x, y, roll) parameters. As another example, a pose of a sensor mounted on a robot may be defined using (x, y, z, roll, pitch, yaw) parameters.

As used herein, network interfaces may include any signal, data, or software interface with a component, network, or process including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, LTE/LTE-A/TD-LTE/TD-LTE, GSM, etc.), IrDA families, etc. As used herein, Wi-Fi may include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

As used herein, processor, processing device, microprocessor, controller and/or digital processor may include any type of digital processing device such as, without limitation, digital signal processors ("DSPs"), reduced instruction set computers ("RISC"), general-purpose ("CISC") processors, microprocessors, gate arrays (e.g., field programmable gate arrays ("FPGAs")), programmable logic device ("PLDs"), reconfigurable computer fabrics ("RCFs"), array processors, secure microprocessors, specialized processors (e.g., neuromorphic processors), and application-specific integrated circuits ("ASICs"). Such digital processors may be contained on a single unitary integrated circuit die or distributed across multiple components.

As used herein, computer program and/or software may include any sequence or human or machine cognizable steps that perform a function. Such computer program and/or software may be rendered in any programming language or environment including, for example, C/C++, C#, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

As used herein, connection, link, and/or wireless link may include a causal link between any two or more entities (whether physical or logical/virtual), which enables information exchange between the entities.

As used herein, computer and/or computing device may include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

Detailed descriptions of the various embodiments of the system and methods of the disclosure are now provided. While many examples discussed herein may refer to specific exemplary embodiments, it will be appreciated that the described systems and methods contained herein are applicable to any kind of robot. Myriad other embodiments or uses for the technology described herein would be readily envisaged by those having ordinary skill in the art, given the contents of the present disclosure.

Advantageously, the systems and methods of this disclosure at least: (i) enable robots to determine extrinsic biases of a sensor without assistance from a human or external server; (ii) improve safety and efficiency of robots operating autonomously by providing systems and methods for verifying calibration of a sensor autonomously; (iii) improve autonomy of robots by further improving self-calibration capabilities of the robots; and (iv) providing additional systems and methods of localization for autonomous robots to further enhance navigation accuracy and capabilities. Other advantages are readily discernible by one having ordinary skill in the art given the contents of the present disclosure.

According to at least one non-limiting exemplary embodiment, a method for determining a pose of a sensor on a robot is disclosed. The method may comprise a controller of the robot determining a first motion of the robot based on a change in pose of the sensor, the change in pose of the sensor being determined based on an image discrepancy between at least two images captured by the sensor at separate times; determining a second motion of the robot based on data from at least one other sensor and odometry unit; and determining the pose of the sensor based on a motion discrepancy between the first motion and the second motion. The method may further comprise capturing a first image at a first time and a second image at a second time using the sensor, the first and second images comprising pixels of at least one target object; determining the image discrepancy by translating and rotating the second image such that the translated and rotated second image matches the first image; and determining the change in pose of the sensor based on the translations and rotations performed on the second image. The sensor being mounted on the robot in a fixed pose and configured to measure at least a depth parameter of objects within a visual scene and produce images encoded with the depth parameter. The method may further comprise the robot localizing itself based on the determined change in pose of the sensor corresponding to a change in pose of the robot, the change in pose of the sensor corresponding to the rotations and translations performed on the second image.

According to at least one non-limiting exemplary embodiment, a robotic system is disclosed. The robotic system may comprise a non-transitory computer readable storage medium comprising a plurality of instructions embodied thereon and a specialized processor or controller configurable to execute the instructions to: determine a first motion of a robot based on a change in pose of a sensor, the change in pose of the sensor being determined based on an image discrepancy between at least two images captured by the sensor at separate times; determine a second motion of the robot based on data from at least one other sensor and odometry unit; and determine the pose of the sensor based on a motion discrepancy between the first motion and the second motion of the robot. The specialized processor or controller of the robotic system may further be configurable to capture a first image using the sensor at a first time and capturing a second image at a second time, the first image and the second image comprising at least in part pixels of at least one object; determine the image discrepancy by translating and rotating the second image such that the translated and rotated second image matches the first image; and determine the change in pose of the sensor based on the translations and rotations performed on the second image. The sensor being mounted on the robot in a fixed pose and configured to measure at least a depth parameter of objects within a visual scene and produce images encoded with the depth parameter. The specialized processor or controller may further be configurable to localize the robot based on the determined change in pose of the sensor corresponding to a change in pose of the robot, the change in pose of the sensor corresponding to the rotations and translations performed on the second image.

FIG. 1A is a functional block diagram of a robot 102 in accordance with some principles of this disclosure. As illustrated in FIG. 1A, robot 102 may include controller 118, memory 120, user interface unit 112, sensor units 114, navigation units 106, actuator unit 108, and communications unit 116, as well as other components and subcomponents (e.g., some of which may not be illustrated). Although a specific embodiment is illustrated in FIG. 1A, it is appreciated that the architecture may be varied in certain embodiments as would be readily apparent to one of ordinary skill given the contents of the present disclosure. As used herein, robot 102 may be representative at least in part of any robot described in this disclosure.

Controller 118 may control the various operations performed by robot 102. Controller 118 may include and/or comprise one or more processors (e.g., microprocessors) and other peripherals. As previously mentioned and used herein, processor, microprocessor, and/or digital processor may include any type of digital processing device such as, without limitation, digital signal processors ("DSPs"), reduced instruction set computers ("RISC"), general-purpose ("CISC") processors, microprocessors, gate arrays (e.g., field programmable gate arrays ("FPGAs")), programmable logic device ("PLDs"), reconfigurable computer fabrics ("RCFs"), array processors, secure microprocessors, specialized processors (e.g., neuromorphic processors), and application-specific integrated circuits ("ASICs"). Such digital processors may be contained on a single unitary integrated circuit die, or distributed across multiple components.

Controller 118 may be operatively and/or communicatively coupled to memory 120. Memory 120 may include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RLDRAM"), static RAM ("SRAM"), flash memory (e.g., NAND/NOR), memristor memory, pseudostatic RAM ("PSRAM"), etc. Memory 120 may provide instructions and data to controller 118. For example, memory 120 may be a non-transitory, computer-readable storage apparatus and/or medium having a plurality of instructions stored thereon, the instructions being executable by a processing apparatus (e.g., controller 118) to operate robot 102. In some cases, the instructions may be configured to, when executed by the processing apparatus, cause the processing apparatus to perform the various methods, features, and/or functionality described in this disclosure. Accordingly, controller 118 may perform logical and/or arithmetic operations based on program instructions stored within memory 120. In some cases, the instructions and/or data of memory 120 may be stored in a combination of hardware, some located locally within robot 102, and some located remote from robot 102 (e.g., in a cloud, server, network, etc.).

It should be readily apparent to one of ordinary skill in the art that a processor or controller may be external to robot 102 and be communicatively coupled to controller 118 of robot 102 utilizing communication units 116 wherein the external processor may receive data from robot 102, process the data, and transmit computer-readable instructions back to controller 118. In at least one non-limiting exemplary embodiment, the processor may be on a remote server (not shown).

In some exemplary embodiments, memory 120, shown in FIG. 1A, may store a library of sensor data. In some cases, the sensor data may be associated at least in part with objects and/or people. In exemplary embodiments, this library may include sensor data related to objects and/or people in different conditions, such as sensor data related to objects and/or people with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library may be taken by a sensor (e.g., a sensor of sensor units 114 or any other sensor) and/or generated automatically, such as with a computer program that is configured to generate/simulate (e.g., in a virtual world) library sensor data (e.g., which may generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library may depend at least in part on one or more of the amount of available data, the variability of the surrounding environment in which robot 102 operates, the complexity of objects and/or people, the variability in appearance of objects, physical properties of robots, the characteristics of the sensors, and/or the amount of available storage space (e.g., in the library, memory 120, and/or local or remote storage). In exemplary embodiments, at least a portion of the library may be stored on a network (e.g., cloud, server, distributed network, etc.) and/or may not be stored completely within memory 120. As yet another exemplary embodiment, various robots (e.g., that are commonly associated, such as robots by a common manufacturer, user, network, etc.) may be networked so that data captured by individual robots are collectively shared with other robots. In such a fashion, these robots may be configured to learn and/or share sensor data in order to facilitate the ability to readily detect and/or identify errors and/or assist events. It will be appreciated by one skilled in the art that memory 120 may include data table that may be a self-referential data table wherein additional rows and/or columns may be added as the controller 118 executes computer readable instructions.

Still referring to FIG. 1A, operative units 104 may be coupled to controller 118, or any other controller, to perform the various operations described in this disclosure. One, more, or none of the modules in operative units 104 may be included in some embodiments. Throughout this disclosure, reference may be to various controllers and/or processors. In some embodiments, a single controller (e.g., controller 118) may serve as the various controllers and/or processors described. In other embodiments different controllers and/or processors may be used, such as controllers and/or processors used particularly for one or more operative units 104. Controller 118 may send and/or receive signals, such as power signals, status signals, data signals, electrical signals, and/or any other desirable signals, including discrete and analog signals to operative units 104. Controller 118 may coordinate and/or manage operative units 104, and/or set timings (e.g., synchronously or asynchronously), turn off/on control power budgets, receive/send network instructions and/or updates, update firmware, send interrogatory signals, receive and/or send statuses, and/or perform any operations for running features of robot 102.

Returning to FIG. 1A, operative units 104 may include various units that perform functions for robot 102. For example, operative units 104 include at least navigation units 106, actuator units 108, user interface units 112, sensor units 114, and communication units 116. Operative units 104 may also comprise other units that provide the various functionality of robot 102. In exemplary embodiments, operative units 104 may be instantiated in software, hardware, or both software and hardware. For example, in some cases, units of operative units 104 may comprise computer-implemented instructions executed by a controller. In exemplary embodiments, units of operative units 104 may comprise hardcoded logic. In exemplary embodiments, units of operative units 104 may comprise both computer-implemented instructions executed by a controller and hardcoded logic. Where operative units 104 are implemented in part in software, operative units 104 may include units/modules of code configured to provide one or more functionalities.

In exemplary embodiments, navigation units 106 may include systems and methods that may computationally construct and update a map of an environment, localize robot 102 (e.g., find the position) in a map, and navigate robot 102 to/from destinations. The mapping may be performed by imposing data obtained in part by sensor units 114 into a computer-readable map representative at least in part of the environment. In exemplary embodiments, a map of an environment may be uploaded to robot 102 through user interface units 112, uploaded wirelessly or through wired connection, or taught to robot 102 by a user.

In exemplary embodiments, navigation units 106 may include components and/or software configured to provide directional instructions for robot 102 to navigate. Navigation units 106 may process maps, routes, and localization information generated by mapping and localization units, data from sensor units 114, and/or other operative units 104.

Still referring to FIG. 1A, actuator units 108 may include actuators such as electric motors, gas motors, driven magnet systems, solenoid/ratchet systems, piezoelectric systems (e.g., inchworm motors), magnetostrictive elements, gesticulation, and/or any way of driving an actuator known in the art. By way of illustration, such actuators may actuate the wheels for robot 102 to navigate a route; navigate around obstacles; rotate cameras and sensors.

Actuator unit 108 may include any system used for actuating, in some cases to perform tasks. For example, actuator unit 108 may include driven magnet systems, motors/engines (e.g., electric motors, combustion engines, steam engines, and/or any type of motor/engine known in the art), solenoid/ratchet system, piezoelectric system (e.g., an inchworm motor), magnetostrictive elements, gesticulation, and/or any actuator known in the art. According to exemplary embodiments, actuator unit 108 may include systems that allow movement of robot 102, such as motorized propulsion. For example, motorized propulsion may move robot 102 in a forward or backward direction, and/or be used at least in part in turning robot 102 (e.g., left, right, and/or any other direction). By way of illustration, actuator unit 108 may control if robot 102 is moving or is stopped and/or allow robot 102 to navigate from one location to another location.

According to exemplary embodiments, sensor units 114 may comprise systems and/or methods that may detect characteristics within and/or around robot 102. Sensor units 114 may comprise a plurality and/or a combination of sensors. Sensor units 114 may include sensors that are internal to robot 102 or external, and/or have components that are partially internal and/or partially external. In some cases, sensor units 114 may include one or more exteroceptive sensors, such as sonars, light detection and ranging ("LiDAR") sensors, radars, lasers, cameras (including video cameras (e.g., red-blue-green ("RBG") cameras, infrared cameras, three-dimensional ("3D") cameras, thermal cameras, etc.), time of flight ("TOF") cameras, structured light cameras, antennas, motion detectors, microphones, and/or any other sensor known in the art. According to some exemplary embodiments, sensor units 114 may collect raw measurements (e.g., currents, voltages, resistances, gate logic, etc.) and/or transformed measurements (e.g., distances, angles, detected points in obstacles, etc.). In some cases, measurements may be aggregated and/or summarized. Sensor units 114 may generate data based at least in part on distance or height measurements. Such data may be stored in data structures, such as matrices, arrays, queues, lists, arrays, stacks, bags, etc.

According to exemplary embodiments, sensor units 114 may include sensors that may measure internal characteristics of robot 102. For example, sensor units 114 may measure temperature, power levels, statuses, and/or any characteristic of robot 102. In some cases, sensor units 114 may be configured to determine the odometry of robot 102. For example, sensor units 114 may include proprioceptive sensors, which may comprise sensors such as accelerometers, inertial measurement units ("IMU"), odometers, gyroscopes, speedometers, cameras (e.g. using visual odometry), clock/timer, and the like. Odometry may facilitate autonomous navigation and/or autonomous actions of robot 102.

This odometry may include robot 102's position (e.g., where position may include robot's location, displacement and/or orientation, and may sometimes be interchangeable with the term pose as used herein) relative to the initial location. Such data may be stored in data structures, such as matrices, arrays, queues, lists, arrays, stacks, bags, etc. According to exemplary embodiments, the data structure of the sensor data may be called an image.

According to exemplary embodiments, user interface units 112 may be configured to enable a user to interact with robot 102. For example, user interface units 112 may include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. Users may interact through voice commands or gestures. User interface units 218 may include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. According to exemplary embodiments user interface units 112 may be positioned on the body of robot 102. According to exemplary embodiments, user interface units 112 may be positioned away from the body of robot 102 but may be communicatively coupled to robot 102 (e.g., via communication units including transmitters, receivers, and/or transceivers) directly or indirectly (e.g., through a network, server, and/or a cloud). According to exemplary embodiments, user interface units 112 may include one or more projections of images on a surface (e.g., the floor) proximally located to the robot, e.g., to provide information to the occupant or to people around the robot. The information could be the direction of future movement of the robot, such as an indication of moving forward, left, right, back, at an angle, and/or any other direction. In some cases, such information may utilize arrows, colors, symbols, etc.

According to exemplary embodiments, communications unit 116 may include one or more receivers, transmitters, and/or transceivers. Communications unit 116 may be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

Communications unit 116 may also be configured to send/receive signals utilizing a transmission protocol over wired connections, such as any cable that has a signal line and ground. For example, such cables may include Ethernet cables, coaxial cables, Universal Serial Bus ("USB"), FireWire, and/or any connection known in the art. Such protocols may be used by communications unit 116 to communicate to external systems, such as computers, smart phones, tablets, data capture systems, mobile telecommunications networks, clouds, servers, or the like. Communications unit 116 may be configured to send and receive signals comprising of numbers, letters, alphanumeric characters, and/or symbols. In some cases, signals may be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 116 may be configured to send and receive statuses, commands, and other data/information. For example, communications unit 116 may communicate with a user operator to allow the user to control robot 102. Communications unit 116 may communicate with a server/network (e.g., a network) in order to allow robot 102 to send data, statuses, commands, and other communications to the server. The server may also be communicatively coupled to computer(s) and/or device(s) that may be used to monitor and/or control robot 102 remotely. Communications unit 116 may also receive updates (e.g., firmware or data updates), data, statuses, commands, and other communications from a server for robot 102.

In exemplary embodiments, operating system 110 may be configured to manage memory 120, controller 118, power supply 122, modules in operative units 104, and/or any software, hardware, and/or features of robot 102. For example, and without limitation, operating system 110 may include device drivers to manage hardware recourses for robot 102.

In exemplary embodiments, power supply 122 may include one or more batteries, including, without limitation, lithium, lithium ion, nickel-cadmium, nickel-metal hydride, nickel-hydrogen, carbon-zinc, silver-oxide, zinc-carbon, zinc-air, mercury oxide, alkaline, or any other type of battery known in the art. Certain batteries may be rechargeable, such as wirelessly (e.g., by resonant circuit and/or a resonant tank circuit) and/or plugging into an external power source. Power supply 122 may also be any supplier of energy, including wall sockets and electronic devices that convert solar, wind, water, nuclear, hydrogen, gasoline, natural gas, fossil fuels, mechanical energy, steam, and/or any power source into electricity.

One or more of the units described with respect to FIG. 1A (including memory 120, controller 118, sensor units 114, user interface unit 112, actuator unit 108, communications unit 116, mapping and localization unit 126, and/or other units) may be integrated onto robot 102, such as in an integrated system. However, according to some exemplary embodiments, one or more of these units may be part of an attachable module. This module may be attached to an existing apparatus to automate so that it behaves as a robot. Accordingly, the features described in this disclosure with reference to robot 102 may be instantiated in a module that may be attached to an existing apparatus and/or integrated onto robot 102 in an integrated system. Moreover, in some cases, a person having ordinary skill in the art would appreciate from the contents of this disclosure that at least a portion of the features described in this disclosure may also be run remotely, such as in a cloud, network, and/or server.

As used here on out, a robot 102, a controller 118, or any other controller, processor, or robot performing a task illustrated in the figures below comprises a controller executing computer readable instructions stored on a non-transitory computer readable storage apparatus, such as memory 120, as would be appreciated by one skilled in the art.

Figure 1B:
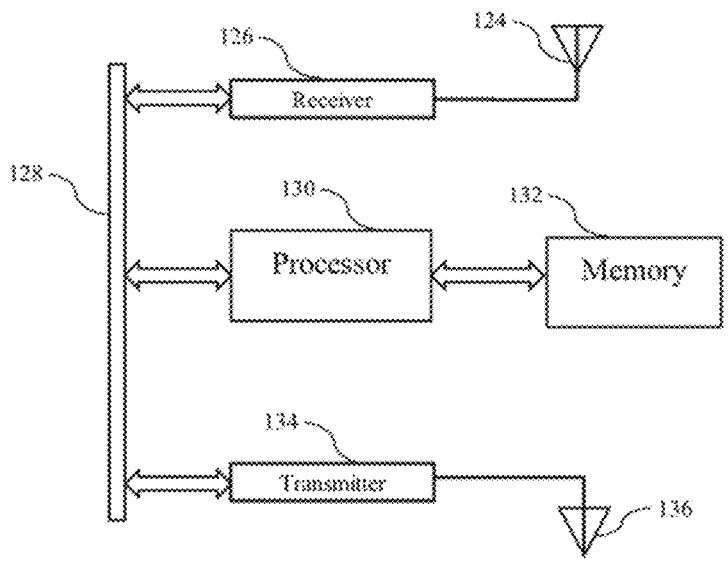
FIG. 1B is a functional block diagram of a controller or processor in accordance with some embodiments of this disclosure.

Next referring to FIG. 1B, the architecture of the specialized controller 118 used in the system shown in FIG. 1A is illustrated according to an exemplary embodiment. As illustrated in FIG. 1B, the specialized computer includes a data bus 128, a receiver 126, a transmitter 134, at least one processor 130, and a memory 132. The receiver 126, the processor 130 and the transmitter 134 all communicate with each other via the data bus 128. The processor 130 is a specialized processor configured to execute specialized algorithms. The processor 130 is configured to access the memory 132, which stores computer code or instructions in order for the processor 130 to execute the specialized algorithms. As illustrated in FIG. 1B, memory 132 may comprise some, none, different, or all of the features of memory 124 previously illustrated in FIG. 1A. The algorithms executed by the processor 130 are discussed in further detail below. The receiver 126 as shown in FIG. 1B is configured to receive input signals 124. The input signals 124 may comprise signals from a plurality of operative units 104 illustrated in FIG. 1A including, but not limited to, sensor data from sensor units 114, user inputs, motor feedback, external communication signals (e.g., from a remote server), and/or any other signal from an operative unit 104 requiring further processing by the specialized controller 118. The receiver 126 communicates these received signals to the processor 130 via the data bus 128. As one skilled in the art would appreciate, the data bus 128 is the means of communication between the different components—receiver, processor, and transmitter—in the specialized controller 118. The processor 130 executes the algorithms, as discussed below, by accessing specialized computer-readable instructions from the memory 132. Further detailed description as to the processor 130 executing the specialized algorithms in receiving, processing and transmitting of these signals is discussed above with respect to FIG. 1A. The memory 132 is a storage medium for storing computer code or instructions. The storage medium may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage medium may include volatile, nonvolatile, dynamic, static, read/write, read-only, random-access, sequential-access, location-addressable, file-addressable, and/or content-addressable devices. The processor 130 may communicate output signals to transmitter 134 via data bus 128 as illustrated. The transmitter 134 may be configured to further communicate the output signals to a plurality of operative units 104 illustrated by signal output 136.

One of ordinary skill in the art would appreciate that the architecture illustrated in FIG. 1B may illustrate an external server architecture configured to effectuate the control of a robotic apparatus from a remote location. That is, the server may also include a data bus, a receiver, a transmitter, a processor, and a memory that stores specialized computer readable instructions thereon.

Figure 2A:
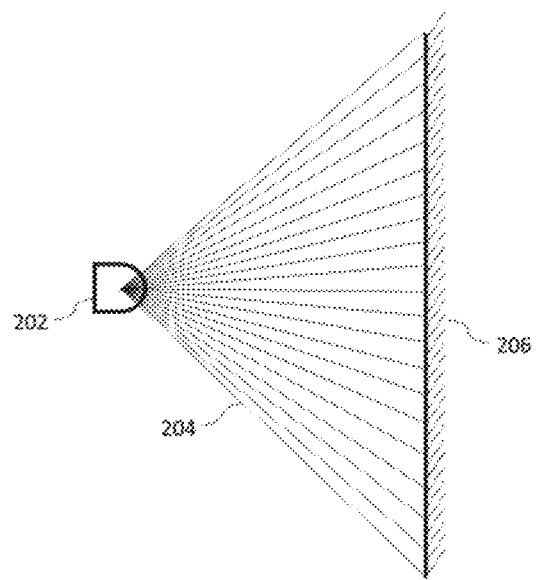
FIG. 2A illustrates a sensor configured to measure a distance parameter of a visual scene in accordance with some embodiments of this disclosure.

FIG. 2A illustrates a sensor 202 coupled to the robot, which collects distance measurements to a wall 206 along a measurement plane in accordance with some exemplary embodiments of the present disclosure. The sensor 202 may be configurable to collect distance measurements to the wall 206 by projecting beams 204 of photons at discrete angles along the measurement plane and determine the distance to the wall 206 based on a time of flight (TOF) of the photon leaving the sensor 202, bouncing off the wall 206, and returning back to the sensor 202. In other words, distance from the wall 206 is based on the return time of the photon emitted from the sensor 202. The measurement plane of the sensor 202 illustrated is the plane of the page.

According to at least one non-limiting exemplary embodiment, sensor 202 may comprise a three dimensional (3D) LiDAR sensor, wherein each beam 204 may be illustrative of a measurement plane at discrete angles. Along each measurement plane, the 3D LiDAR sensor 202 may send a plurality of beams 204 of photons at discrete angles along the measurement plane normal to the measurement planes (i.e., normal to the plane of the page).

According to at least one non-limiting exemplary embodiment, sensor 202 may be illustrative of a depth camera sensor configurable to capture color or grayscale images encoded with distance measurements 204, wherein each image captured comprises a plurality of pixels encoded with color data (e.g., red/green/blue values or greyscale values) in addition to a distance value. According to at least one non-limiting exemplary embodiment, sensor 202 may be illustrative of a binocular array of two or more imaging cameras separated spatially, wherein the binocular array may be configured to capture images of a visual scene (e.g., wall 206) and encode the images with depth measurement based on a pixel-wise disparity between images captured simultaneously by the two or more cameras and the spatial separation of the two or more cameras. In other words, sensor 202 may be illustrative of any LiDAR, camera, or other sensor type or configuration capable of at least capturing depth measurements 204 in two or three dimensions to be utilized in generating point clouds, as illustrated next in FIG. 2B.

One skilled in the art would appreciate that a plurality of sensors 202 may be positioned on a robot chassis 102 to enhance the navigation and localization capabilities of the robot 102. These sensors 202 may be mounted in static positions (e.g., using screws, bolts, etc.) or may be mounted with servomotors configured to adjust the pose of the sensor 202 if needed. Alternatively, sensors 202 may be mounted on a gimbal support structure that allows rotation of the sensors 202 about a single axis. Calibration of these sensors 202 may be essential for a robot 102 to navigate through an environment safely and perform complex tasks accurately. Calibration of sensors 202 may degrade over time due to, for example, wear and tear, collisions with objects or people, and/or electrical components of the sensor performing abnormally due to, e.g., temperature fluctuations.

Figure 2B:
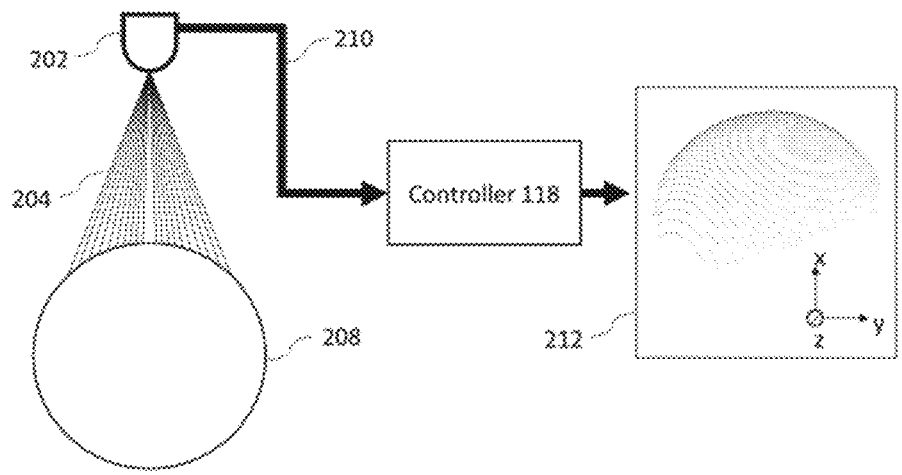
FIG. 2B illustrates a controller of a robot utilizing data from a sensor to generate a point cloud representation of an object in accordance with some embodiments of this disclosure.

FIG. 2B illustrates a sensor 202 capturing measurements 204 of an object 208 to generate a point cloud 212, according to an exemplary embodiment. Measurements 204 may comprise of a plurality of depth measurements in two or three dimensions, each measurement 204 being taken at discrete angles across a field of view of the sensor 202. Measurements 204 may additionally comprise color and/or other image data (e.g., sensor 202 may be a depth camera, wherein measurements 204 may comprise depth measurements and image data (e.g., RGB or grayscale) of the object 208). Data 210 from the sensor 202 is sent to a controller 118 of a robot 102 to be processed into a point cloud 212. A point cloud 212 may comprise of a 3D representation of the image data 210, wherein the controller 118 may utilize the depth parameters of measurements 204 to generate the 3D representation of the object 208. The point cloud 212 may comprise of a plurality of points, each point corresponding to a single depth measurement 204 taken by the sensor 202.

According to at least one non-limiting exemplary embodiment, each point within a point cloud 212 may be further encoded with color, luminance, or other data (e.g., velocity for points on moving objects) captured by the sensor 202 and/or encoded by the controller 118.

Figure 3A:
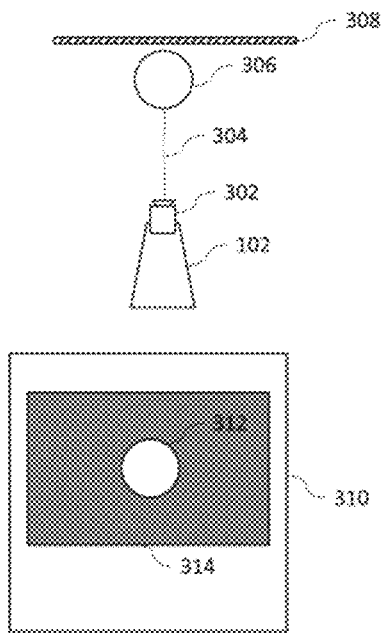
FIG. 3A-B illustrates a robot capturing two images encoded with distance measurements of an object within a visual scene, according to an exemplary embodiment.

FIG. 3A illustrates a top view of a robot 102 utilizing a sensor 302 to capture an image 310 (i.e., the first image) of an object 306, according to an exemplary embodiment. Sensor 302 may comprise a fixed position sensor configured to capture depth data of a scene. Sensor 302 may comprise, for example, a depth camera, a LiDAR sensor, a binocular array of cameras, or other sensor type or configuration of sensor(s) capable of measuring depth within a visual scene and encoding the depth into images or point cloud representations. The image 310 may comprise the object 306 represented by a location 312 and the background wall 308 represented by a dark grey object 314.

Figure 3B:
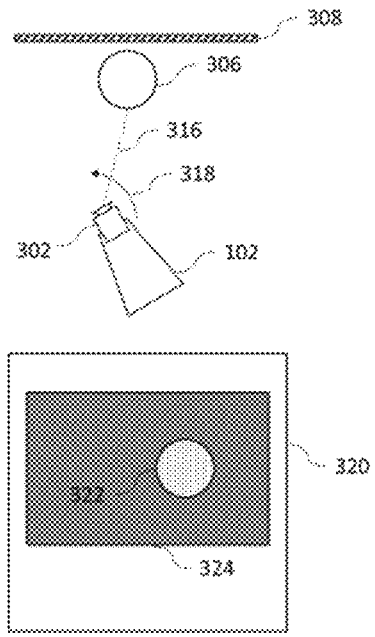

Similarly, in FIG. 3B, the robot 102 executes a left turn, as indicated by arrow 318, and captures a second image 320 at a subsequent time, according to an exemplary embodiment, that is different from the first image 310. Upon execution of the left turn, while the object 306 may be stationary, or alternatively moving away from the robot 102, a distance measurement 316 between the sensor 302 and the object 306 is increased as compared to an initial distance measurement 304 illustrated in FIG. 3A. Accordingly, the second image 320 produced may comprise the object 306 represented at a location 322, marked by different shading to represent different location, and a dark grey background wall 324, both object representations comprising encoded pixels of increased distance measurement with respect to the representations of the object 306 in FIG. 3A. Additionally, due to the leftward turn, the object 306 within the second image 320 at location 322 has shifted rightward with respect to its location 312 in the first image 310. This disparity in location and depth measurement of the object 306 between the two images 310 and 320 may be utilized to determine motion 318 of the robot 102 utilizing systems and methods illustrated in the figures below.

Figure 4:
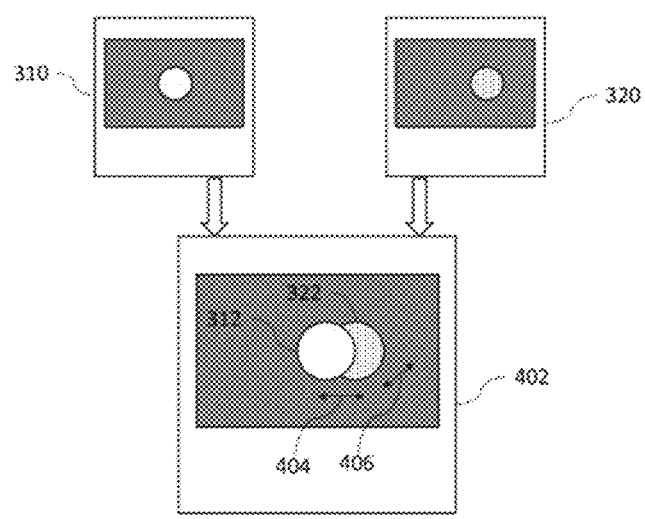
FIG. 4 illustrates a controller of a robot determining image disparity measurements used for recreation of a change in pose of a sensor, according to an exemplary embodiment.

FIG. 4 is a functional block diagram illustrating a controller 118 of a robot 102 evaluating two images 310 and 320, captured sequentially as the robot 102 executes a maneuver 318, to determine a spatial disparity measurement 404 and a depth disparity measurement 406, according to an exemplary embodiment. The images 310 and 320 may comprise a red, green, blue, distance (RGBD) or greyscale depth image of an object 306 illustrated above in FIG. 3A-B. The two images 310 and 320 are received by the controller 118 and overlaid, overlapped, or superimposed to form a composite image 402. The composite image 402 may then be evaluated to determine: (i) depth disparity measurement 406 based on a difference in depth parameters of pixels of the representation of the object 306 between the two images 310 and 320 (i.e., depth parameter disparity between representation locations 312 and 322); and (ii) a spatial disparity measurement 404 based on an at least one pixel difference between a location 312 and 322 of the object 306 within the two images 310 and 320. To evaluate the measurements 404 and 406, the controller 118 may shift along x, y, and/or z axis and/or rotate along yaw, pitch and/or roll axis, a point cloud representation of the second image 320 such that the shifted and/or rotated image 320 matches the first image 310. Each image 310 and 320 may be considered to be a 3-dimensional (3D) image due to the depth parameter and processed as point clouds comprising a plurality of points at locations determined by the depth data of the first and second images 310, 320, wherein the second image 320 may be shifted and/or rotated such that a point cloud representation of the shifted and/or rotated image 320 matches a point cloud representation of the image 310 with minimal error. This evaluation may be performed using a plurality of optimization algorithms (e.g., 3D iterative closest point (ICP) algorithm, Kanade-Lucas-Tomasi (KLT) feature tracker, scale-invariant feature transform (SIFT), etc.) well known within the art to minimize an error (i.e., RMS, L1, L2, etc.) associated with matching the second image 320 with the first image 310, wherein an error of zero may correspond to the second image 320 being shifted and/or rotated to perfectly match the first image 310. The controller 118 may store any shift and/or rotation performed on the second image 320 to determine motion of the robot 102 during the time period between the capture of the first image 310 and the second image 320.

The motion of the robot 102 may be determined based on a change in pose of the sensor 302 between the time the first image 310 is captured and the time the second image 320 is captured, wherein the sensor 302 is assumed to be in a fixed position on the robot 102 during this time period. The change in pose of the sensor 302 may be based on measurements 404 and 406. That is, the rotations and/or shifting performed to match the images 310 and 320 may directly correlate with the movements of the sensor 302.

According to at least one non-limiting exemplary embodiment, a separate image processing unit internal or external to the robot 102 may be utilized to determine the spatial disparity measurement 404 and depth disparity measurement 406 between the two images 310 and 320.

According to at least one non-limiting exemplary embodiment, spatial disparity measurement 404 may additionally comprise a vertical component. In other words, the spatial disparity measurement 404 may comprise translational and vertical components, wherein the pure translational component of the spatial disparity measurement 404 is not intended to be limiting for purposes of the disclosure herein.

According to at least one non-limiting exemplary embodiment, a point cloud representation of the first image 310 may be shifted and/or rotated to match a point cloud representation of the second image 320 to determine a change of pose, or motion, of a sensor 302.

Figure 5A:
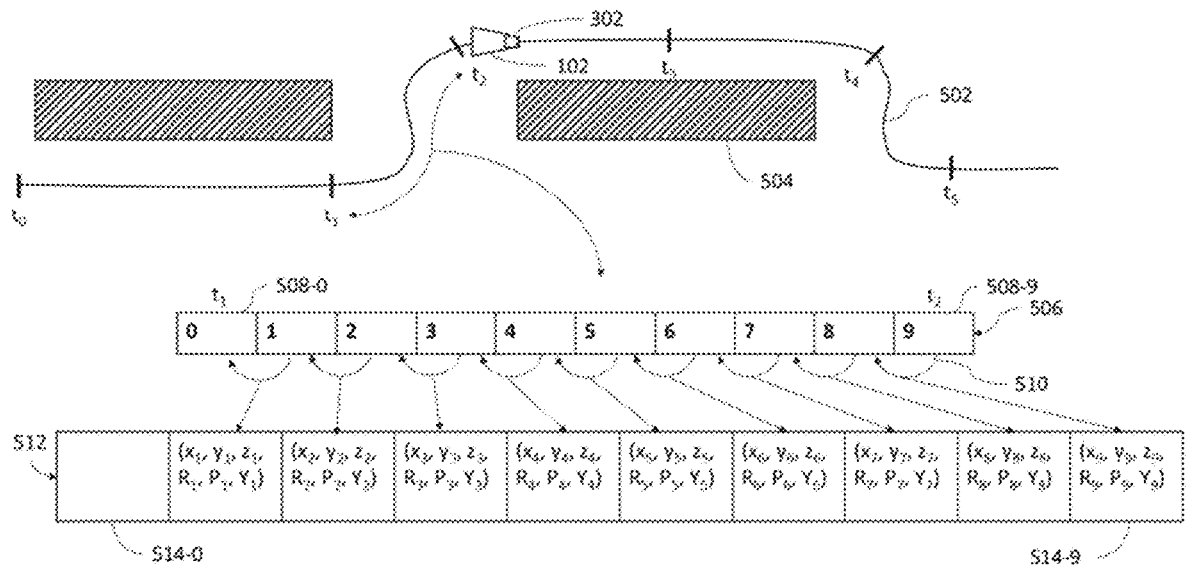
FIG. 5A illustrates a controller of a robot utilizing a plurality of images captured by a sensor and encoded with depth measurements to determine positions of the sensor during capture of corresponding images, according to an exemplary embodiment.

FIG. 5A illustrates a robot 102 navigating a route 502 around one or more obstacles 504 and collecting a plurality of image frames 508 from a sensor 302 to determine its motion based on the plurality of image frames 508 captured by the sensor 302, according to an exemplary embodiment. By way of illustrative example, between time $t_1$ and $t_2$ the robot 102 may navigate the route 502 and capture ten image frames 508 using the sensor 302 to generate an image stream 506. The ten image frames 508 being indexed as 0-9. A controller 118 of the robot 102 may then determine in real-time image discrepancies 510 comprising changes in x position, y position, z position, and depth measurement of an object (e.g., surfaces of object 504 or other nearby objects not illustrated) between sequential images 508 within the image stream 506. That is, image discrepancy 510 may further comprise spatial disparity measurement 404 and depth disparity measurement 406 illustrated in FIG. 4 above. Accordingly, a change in pose of the sensor 302 may then be determined based on the image discrepancy 510 and the new pose 514 may be stored in a separate stream 512 comprising a plurality of poses of the sensor 302 during capture of a corresponding image 508 between times $t_1$ and $t_2$. Navigation of route 502 by robot 102 may be done either in autonomous mode or in a learning mode. In the learning mode, unlike the autonomous mode, robot 102 is maneuvered along a desired path by a user or operator. Thereby, guiding path of the robot 102 and controlling the data collected by the sensors along the travelled path.

Letters $R_i$, $P_i$, and $Y_i$ corresponding to roll, pitch, and yaw values of the i'th pose 514-$i$ respectively, wherein i being a positive integer. The poses 514 may comprise an x, y, and z position and a roll, pitch, and yaw orientation at locations wherein a corresponding image is captured (e.g., pose 514-3 corresponding to a pose of the sensor 302 during capture of image 508-3, and so forth). The stream 512 may then be utilized to recreate the movement of the sensor 302 and thereby recreate the movement of the robot 102 as the sensor 302 is in a fixed position. To determine pose 514-0, the controller 118 determines an image discrepancy 510 between the first image 508-0 in the image stream 506 and a last image (e.g., 508-9) of a previous image stream corresponding to a previous segment of route 502 (i.e., the segment between time $t_0$ and $t_1$).

According to at least one non-limiting exemplary embodiment, a pose 514-0 of a stream 512 may comprise the same pose as a final pose 514-9 of a previous stream 512. Similarly, the first image 508-0 of an image stream 506 may be the same image as a final image 508-9 of a previous image stream 506 corresponding to a previous segment.

According to at least one non-limiting exemplary embodiment, a controller 118 may generate an image stream 506 comprising of all of images 508 captured between time $t_0$ and time $t_N$, time $t_N$ corresponding to the total time to navigate the route 502. However, this embodiment may only be preferred for short routes as storing a large number of depth encoded images may occupy a large amount of memory space in memory 120.

According to at least one non-limiting exemplary embodiment, a route 502 may be segmented based on length, a prescribed number of state points along the route 502, or a specified number of image frames 508 within the image stream 506 (i.e., based on the image capture rate of the sensor 302), wherein segmentation of the route 502 based on time is not intended to be limiting.

It is appreciated that the process of determining a pose 514 of the sensor 302 over time using algorithms such as 3D ICP and the like may impose a large computational load on the controller 118 and/or may occupy large amounts of memory space. Accordingly, it may be advantageous to segment or compartmentalize a route 502 as illustrated, and thereby determine changes in pose one across individual time segments and recombine the changes in pose (i.e., form a single stream 512 between times $t_0$ and $t_N$) to form a recreation of the route 502. The recreation of the route 502 may additionally be utilized to calibrate the sensor 302, as illustrated in the FIGS. 7-9 below. Additionally, it is appreciated that the controller 118 may determine motion of the sensor 302 upon completion of the route 502 as the high computational load and/or large amounts of occupied memory space required to determine changes in pose 514 may be too large to simultaneously navigate the robot 102.

Figure 5B:
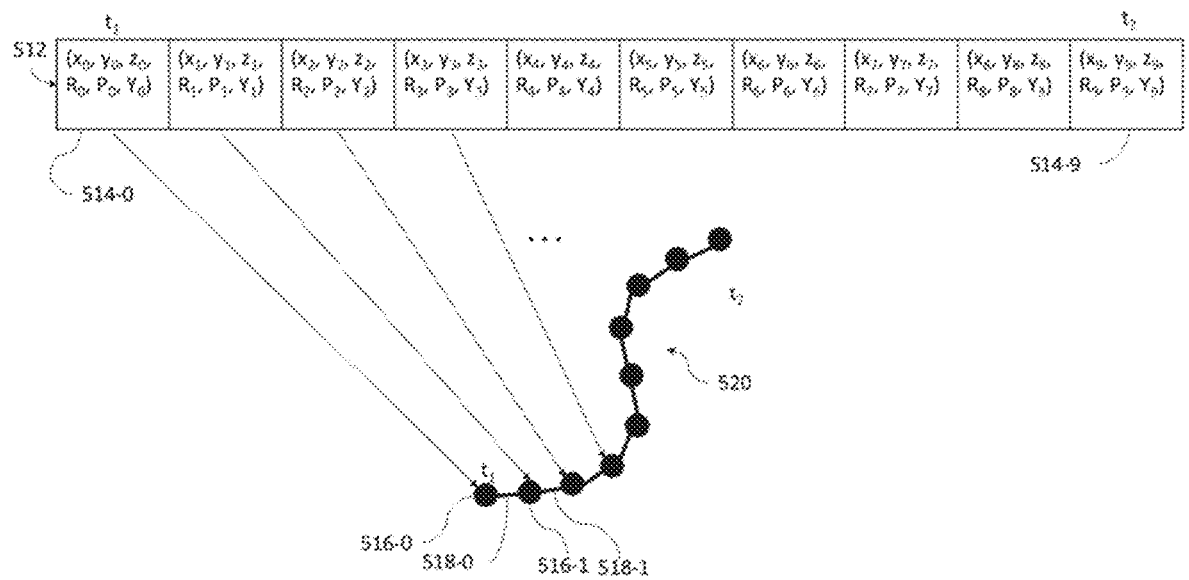
FIG. 5B illustrates a controller of a robot recreating a motion of a sensor, and thereby motions of the robot, based on a plurality of determined positions of the sensor during capture of a plurality of corresponding images, according to an exemplary embodiment.

FIG. 5B illustrates a controller 118 recreating motion 520 of a robot 102 along a segment of a route 502, illustrated in FIG. 5A above, based on a stream 512 of poses 514 of a sensor 302, according to an exemplary embodiment. The recreated segment illustrated comprises a portion of the route 502 navigated by a robot 102 between a time interval beginning at a time $t_1$ and ending at a time $t_2$, as illustrated in FIG. 5A above. The controller 118 may utilize the poses 514 of the sensor 302 during capture of corresponding images 508 to recreate the motion 520 of the robot 102. For example, pose 514-0 may comprise a location and orientation of the sensor 302 at time $t_1$. Pose 514-1 may comprise a location of the sensor 302 at which a second image of an image stream 506 was captured. Accordingly, point 516-1 may then be localized at a location and orientation ($x_1$, $y_1$, $z_1$, $R_1$, $P_1$, $Y_1$) and connected to the previous point 516-0 by a straight line 518-0. Similarly, changes in roll, pitch, and yaw of the sensor 302 between two points 516 may be assumed to be linear. The recreated motion 520 may not perfectly match the original portion of the route 502 as the controller 118 approximates movements between two points 516 as a straight line and linear angular movement, however, one skilled in the art would appreciate that increasing the resolution by increasing the number of images 508 captured within the time interval $t_1$-$t_2$ may generate a recreated motion 520 which more closely approximates the portion of the route 502. The number of images captured within an image stream 506, and thereby the resolution of the recreated motion 520, may depend on processing and memory capabilities of the robot 102. It would be appreciated by one skilled in the art that route 520 travelled by robot 102 may correspond to robot 102 traveling in autonomous mode and not the learning mode.

According to at least one non-limiting exemplary embodiment, an external processor may be utilized to perform some or all of the measurements and/or functions illustrated in FIGS. 5A-B. For example, a robot 102 may utilize communication units 116 to upload an image stream 506 to an external cloud server in real time or upon completion of the route 502. The cloud server may determine image discrepancies 510, determine poses 514 of a stream 512, and recreate motion of the robot by localizing points 516 and generating a recreated motion 520. Advantageously, use of an external cloud server or external processing unit may enable robots 102 of low processing capabilities or low memory to recreate its motion using depth encoded images 506.

Figure 6:
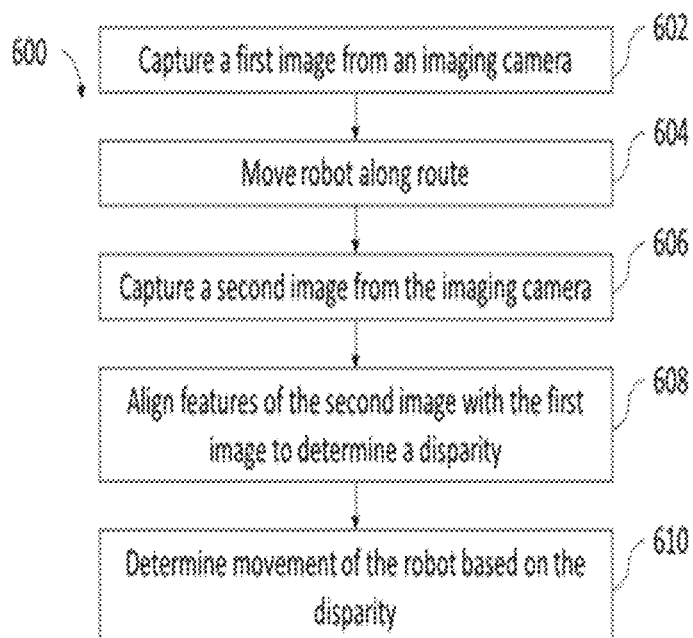
FIG. 6 is a process flow diagram illustrating a method for a controller of a robot to recreate a movement of the robot based on two images captured sequentially by a sensor, according to an exemplary embodiment.

FIG. 6 is a process flow diagram illustrating a method 600 for a controller 118 of a robot 102 to determine a movement of the robot 102 using images captured by a sensor 302 between a time $t_0$ and a time $t_1$, according to an exemplary embodiment.

Block 602 comprises the controller 118 utilizing a sensor 302, configured to measure depth of a scene, to capture a first image at time $t_0$. The first image captured may comprise at least one salient object (e.g., representation of the object at location 312 or 322 of object 306 illustrated in FIG. 3A-C) identifiable by the controller 118 and a plurality of pixels each encoded with a distance measurement. Salient objects may comprise, for example, nearby colorful objects, nearby bright objects (e.g., lamps or light fixtures), patterns on surfaces, and/or any other detectable object or feature within an environment. With respect to detecting and tracking salient objects, U.S. Pat. No. 10,032,280, titled "Apparatus and Methods For Tracking Salient Features," in incorporated herein by reference in its entirety.

Block 604 comprises the controller 118 moving the robot 102 along a route by activating one or more actuators, the movement being executed in accordance with a target trajectory or route.

Block 606 comprises the controller 118 capturing a second image at time $t_1$ using the imaging camera. The second image captured may comprise, at least in part, the at least one salient object captured in the first image. It is appreciated that the time period $t_0$-$t_1$ may be short (e.g., 0.05 seconds for an imaging camera operating at 20 Hz) such that the at least one salient object may still remain, at least in part, in both the first and second image frames.

Block 608 comprises the controller 118 aligning, or superimposing, the at least one salient objects of the second image with the at least one salient objects of the first image by shifting and/or rotating the second image. The shift and/or rotation may be performed on a point cloud representation of the second image such that points of the shifted and/or rotated point cloud representation of the second image matches with points of a point cloud representation of the first image with minimal error. The shift and/or rotation may be utilized to determine spatial disparity and depth disparity measurements 404 and 406, illustrated in FIG. 4, of image discrepancies 510, illustrated in FIG. 5A, such that a change in pose of the sensor 302 between time $t_0$ and $t_1$ may be determined.

Block 610 comprises the controller 118 determining the movement of the robot 102 between time $t_0$-$t_1$ based on the change in pose of the sensor 302 determined in block 608 above. The change in pose of the sensor 302 may be translated to a change in pose of the robot 102 based on the fixed location of the imaging camera relative to a reference point of the robot 102, the reference point of the robot 102 comprising a point, which may be a dimensionless point, of which the center or origin (i.e., (0,0,0) point) of the robot 102 is defined. For example, if it is determined that a (x, y, z, roll, pitch, yaw) pose of the imaging camera changed by ($\Delta x$, 0, 0, 0°, 0°, 0°) between time $t_0$-$t_1$, then the change in position of the robot 102 may be determined to be ($\Delta x$, 0, 0, 0°, 0°, 0°) over this time period due to the position of the sensor 302 being fixed on the robot 102. Stated differently, the change in the position, orientation or direction of the robot 102 may correlate or correspond to the change in the position of the sensor 302. The controller 118 may approximate and estimate translational and/or angular motion of the robot 102 between time $t_0$-$t_1$ with a linear approximation, as shown above in FIG. 5B with respect to straight lines 518 connecting two sequential points 516 to recreate motion of the robot 102.

According to at least one non-limiting exemplary embodiment, the imaging camera may be configured to move about x, y, z, yaw, pitch, and/or roll axis utilizing actuators controlled by a controller 118, wherein any additional controlled movement of the imaging camera may additionally be used to determine a change in position of the robot 102 between time $t_0$-$t_1$.

The above FIGS. 3-6 illustrate systems and methods for determining a change in pose of a sensor 302 based on a discrepancy between two images captured over a period of time, thereby enabling a controller 118 of a robot 102 to determine a change in position of the sensor 302 over the period of time $t_0$-$t_1$ based only on the images captured by the sensor 302. Due to the fixed position of the sensor 302, the motion of the robot 102 may therefore be estimated. The motion estimation performed by the controller 118 using the two or more images may then be compared to other odometry data yielding an unconventional result in that extrinsic biases of the sensor 302 may be determined based on discrepancies between an estimated motion using the two images and an estimated motion using data from other sensor and/or odometry units.

Figure 7:
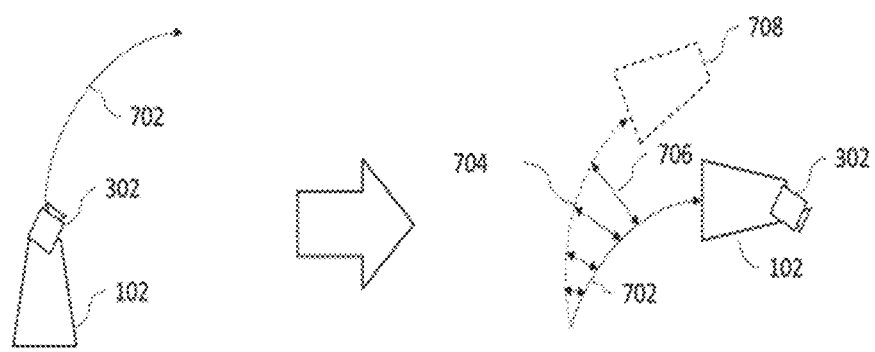
FIG. 7 illustrates a robot comprising a biased sensor to illustrate effects of sensor bias on localization of the robot, according to an exemplary embodiment.

FIG. 7 illustrates a robot 102 comprising a biased sensor 302 navigating a route 702, according to an exemplary embodiment. The sensor 302 may comprise an extrinsic bias along its x, y, z, roll, pitch, and/or yaw axis. During navigation of the route 702, the robot 102 may capture a plurality of images using the sensor 302, each image comprising RGB or greyscale images encoded with depth measurements of at least one nearby salient object (not shown) used for motion estimation of the robot 102. Using the method 600 illustrated in FIG. 6 above, the robot 102 may, due to the extrinsic bias of the sensor 302, estimate its movement by route 704 and its final position at location 708, however the robot 102 may have actually navigated along the route 702 properly as illustrated, wherein the actual movement of the robot 102 along the route 702 may be determined based on data from a plurality of well calibrated odometry and sensor units (excluding the sensor 302). The robot 102 may verify that it has navigated the route 702 properly using a plurality of other sensors and/or odometry units 114 such as, for example, wheel encoders, steering encoders, LiDAR sensors, global positioning systems (GPS), or a combination thereof.

Accordingly, motion discrepancies 706 between points along the route 702 and points along the estimated movement 704 may be determined, the points along the route 702 and estimated motion 704 compared to determine motion discrepancies 706 comprise points where the robot 102 estimates its location along estimated motion 704 and along route 702 at corresponding instances in time. The motion discrepancies 706 may comprise a plurality of discrepancy measurements between points along the route 702 and points along the estimated movement 704, wherein only four measurements have been illustrated for clarity. The number of discrepancy measurements taken may depend on an image capture rate of the sensor 302 and/or resolution of the route 702 (i.e., number of state points along the route 702).

One skilled in the art may appreciate that the motion discrepancy 706 between the navigated route 702 and the estimated motion 704 may be caused by a plurality of degenerate external biases of the sensor 302. That is, there may exist more than one pose for the sensor 706, which may cause the controller 118 to estimate the motion of the robot 102 as the motion 704. However, route segmentation as illustrated next in FIG. 8 above may provide the controller 118 with sufficient data to determine a most plausible external bias of the sensor 302 out of the plurality of degenerate external biases. Additionally, it is appreciated that a desired pose of the sensor 302 is known (e.g., from a manufacturer or defined as (0, 0, 0, 0°, 0°, 0°), the desired pose corresponding to a pose of the sensor 302 in a perfectly calibrated state, wherein determining extrinsic biases of the sensor 302 may be based on a difference between the desired pose and a current pose of the sensor 302.

Figure 8:
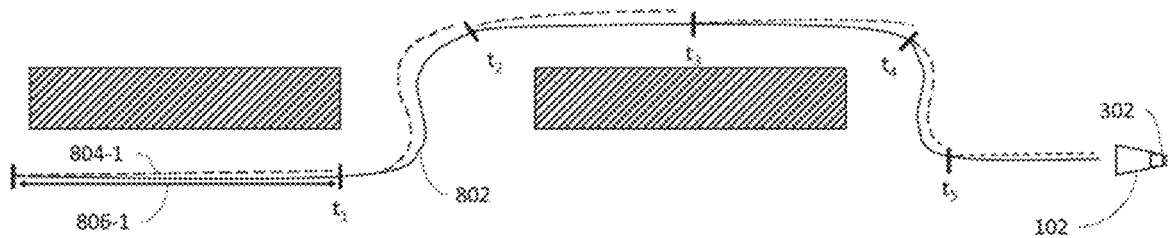
FIG. 8 illustrates a robot comparing an estimated motion, determined using depth encoded images from a sensor, to an executed motion to determine extrinsic biases of the sensor, according to an exemplary embodiment.

FIG. 8 illustrates a robot 102 determining an extrinsic bias of a sensor 302 after navigating a route 802 comprising m segments 806, according to an exemplary embodiment, wherein m is a positive integer. The robot 102 may have completed the route 802 and collected a plurality of images using the sensor 302 during the navigation of the route 802. The plurality of images may be segmented into m streams of images 402 and utilized to determine an estimated motion 804 (illustrated by dashed lines) of the robot 102 for each respective segment 806. As illustrated, the estimated motion 804 may not perfectly coincide with the navigated route 802 due to the extrinsic bias of the sensor 302. Accordingly, motion discrepancies 706 (not shown in FIG. 8) may be determined between the navigated route 802 and the estimated motion 804. A controller 118 of the robot 102 may first evaluate possible extrinsic biases of the imaging camera 302, which may cause the estimated motion 804-1 to deviate from the segment 806-1 based on the motion discrepancies 706. The controller 118 may then repeat this process for all m segments of the route 802 such that a most probable pose of the sensor 302, and therefore most probable external biases, may be determined. The controller 118 determines the most probable pose of the sensor 302 based on, for example, a maximum a posteriori (MAP) estimation which minimizes an error probability, the error probability corresponding to a probability that the determined pose of the sensor 302 based on the data collected during navigation of the route 802 is incorrect.

The controller 118 may determine a continuous distribution function (CDF) for each x, y, z, roll, pitch, and yaw value of the pose of the sensor 302 measured over a period of time prior to navigation of the route 802 or may receive the CDFs via wired/wireless communication. These CDFs may comprise small variance due to noise and/or other perturbations (e.g., bumpy floors) and may be utilized by the controller 118 as a set of priors for the MAP estimation of the pose of the sensor 302. Additionally, the controller 118 may presume the extrinsic biases of the sensor 302 remain constant during navigation of the route 802 such that a determination of a single most probable pose of the sensor 302 may be determined. It is appreciated by one skilled in the art that increasing value of m whilst maintaining the length of segments 806 may yield more accurate data of the pose of the sensor 302, which causes the estimated motion 804 of the robot 102 to deviate from the route 802 as the distributed system of data collection may enhance the MAP estimation by reducing variance of the determined pose values.

According to at least one non-limiting exemplary embodiment, a controller 118 may determine a most probable pose of a sensor 302 based on other estimation methods such as, for example, choosing a most frequently determined pose from a set of possible poses, maximum likelihood (ML) estimation, simulations of the estimated motion 804 with the sensor 302 at a determined pose, or a combination thereof.

Figure 9:
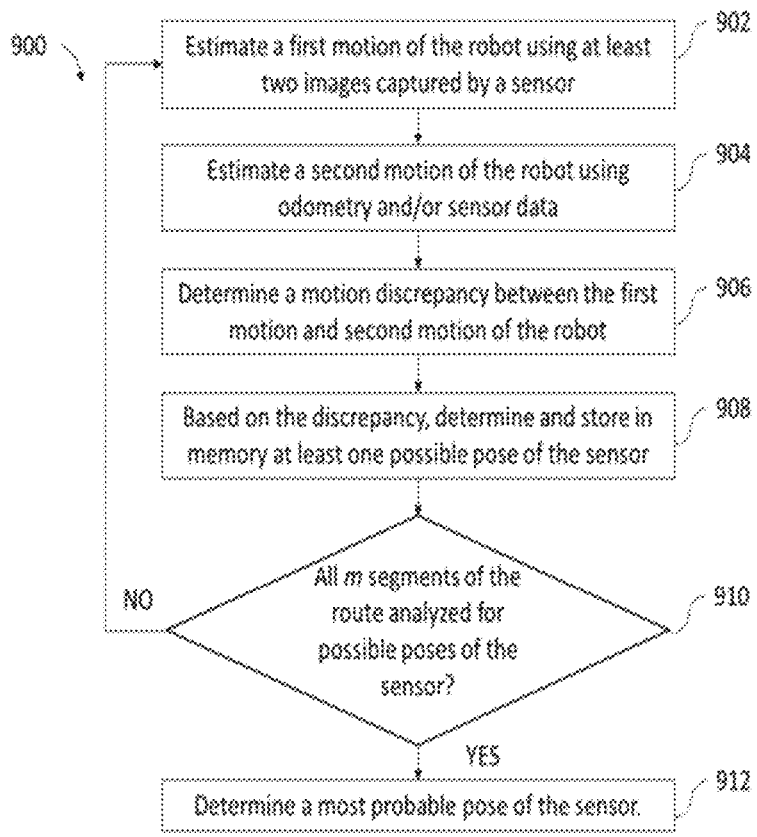
FIG. 9 is a process flow diagram illustrating a method for a controller of a robot to determine extrinsic biases of a sensor using data from the sensor and data from at least one other sensor or odometry unit, according to an exemplary embodiment.

FIG. 9 is a process flow diagram illustrating a method for a controller 118 to determine a most probable pose, out of a plurality of possible poses, for a sensor 302 based on image data from the sensor 302 and odometry data from other sensor units 114, according to an exemplary embodiment. The determined most probable pose of the sensor 302 may then be utilized for calibration as extrinsic biases of the pose of the sensor 302 may be determined.

Block 902 comprises the controller 118 estimating a first motion 804 of the robot 102 using at least two images captured by the sensor 302. The motion estimation 804 may comprise determining a change in pose of the sensor 302 based on an image discrepancy 510 in accordance with method 600 illustrated in FIG. 6 above.

Block 904 comprises the controller 118 estimating a second motion of the robot 102 based on odometry and/or sensor data from other odometry and/or sensor units 114. The controller 118 may utilize data from the other sensor units 114 to determine the second motion of the robot 102 using a plurality of well-known methods readily discernible by one skilled in the art. According to at least one non-limiting exemplary embodiment, the controller 118 may additionally receive data from external sensor units such as, for example, closed circuit television (CCTV) cameras, GPS, and/or external sensors (e.g., LiDAR, pressure, or contact sensors) to estimate the second motion of the robot 102.

Block 906 comprises the controller 118, determining motion discrepancies 706 between the first motion 804 of the robot 102 and the second motion of the robot 102. The motion discrepancies 706 may comprise a plurality of discrepancy measurements between n discretized points along the first motion and the second motion of the robot 102 as illustrated above in FIG. 7, wherein n is a positive integer. Each of the n comparisons comprises a measurement of differences in (x, y, z) position and orientation angle (e.g., a single angle for a robot 102 localizing itself on a 2D map) of the robot 102 between state points of the first motion and state points of the second motion. The state points may be distributed along corresponding motions based on, for example, a constant distance separation (e.g., each state point separated by 1 foot) or a constant time separation (e.g., robot 102 reaches sequential state points after a set time period to), wherein the state points comprise state and pose data for the robot 102 at corresponding locations such that executing state points sequentially corresponds to the robot 102 navigating a route.

Block 908 comprises the controller 118, utilizing the motion discrepancies 706 to determine at least one possible pose for the sensor 302. As previously mentioned, a plurality of degenerate poses of the sensor 302 may cause the controller 118 to estimate the first motion of the robot 102. Accordingly, the controller 118 may determine a set of possible poses exceeding a minimum probability threshold; the minimum probability threshold being configured to omit poses of low probability.

According to at least one non-limiting exemplary embodiment, additional thresholds may be imposed such that outlier poses may be omitted. For example, a controller 118 may determine a pose of a sensor 302 to be unreasonable based on physical constraints of the mounting of the sensor 302. These thresholds may be communicated by an operator or manufacturer of the robot 102 via wired or wireless communication.

Block 810 comprises the controller 118, determining if all m segments 806 of a route 802 have been evaluated for possible poses of the sensor 302, with m being a positive integer number.

Upon the controller 118 determining not all m segments 806 have been evaluated, the controller 118 returns to block 902 to evaluate the next segment 806 and execute the steps set forth in box 904 through 908.

Upon the controller 118 determining all m segments 806 have been evaluated, the controller 118 moves to block 812.

Block 812 comprises the controller 118, evaluating a plurality of poses of the sensor 302 to determine a most probable pose of the sensor 302. During each evaluation of a segment 806 of the route 802 (i.e., blocks 902-908), the controller 118 may determine sets of at least one possible pose for the sensor 302. The controller 118, upon evaluating all m segments 806 of the route, may compile all m sets of at least one possible pose for the sensor to determine the most probable pose of the sensor. The controller 118 may perform this evaluation based on, for example, a MAP estimation which minimizes an error probability, wherein prior CDFs of pose values may be utilized as priors for the MAP estimation.

According to at least one non-limiting exemplary embodiment, the controller 118 may determine a most probable pose for the sensor 302 based on other probabilistic estimation methods such as, for example, ML estimation or utilizing the most frequent pose as the most probable pose of the sensor 302. The estimation method may vary based on, including but not limited to, the type of robot 102, length of route, application of the motion estimation, and/or prior odometry and sensor data.

The controller 118 may utilize the most probable pose to determine extrinsic biases of the sensor 302 based on discrepancies between the most probable pose and a known ideal pose of the sensor 302, wherein the known ideal pose of the sensor may comprise of (0, 0, 0, 0°, 0°, 0°) values or set values determined by an operator or manufacturer of the robot 102 and stored in memory 120. Upon determining the external biases of the sensor 302, the controller 118 may, for example, call for human assistance if the external biases exceed a prescribed threshold as a safety measure, adjust the pose of the sensor using one or more actuators, or virtually transform data received by the sensor 302 do adjust for the extrinsic biases.

Figure 10A:
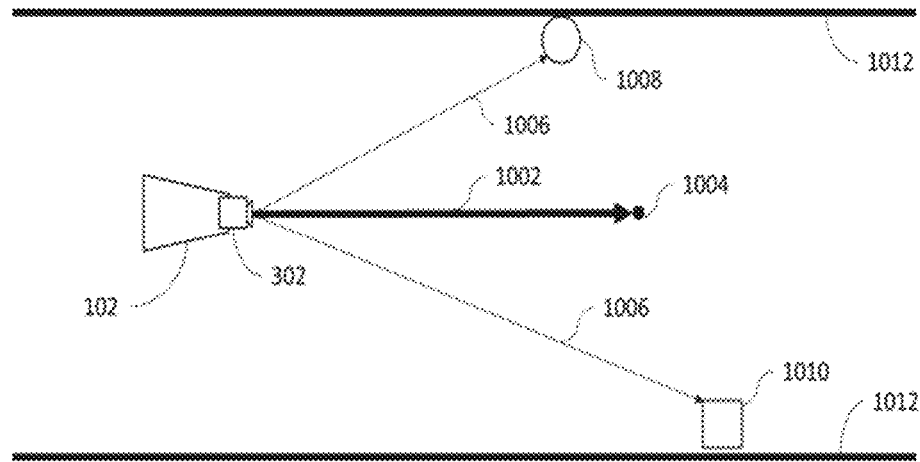
FIG. 10A-B illustrates a robot utilizing two salient objects to localize itself and determine a localization error caused by wheel slippage, according to an exemplary embodiment.

FIG. 10A illustrates a robot 102 navigating a route 1002 to a point 1004 and utilizing an imaging camera 302 to localize itself within a hallway, according to an exemplary embodiment. The sensor 302 in this embodiment may comprise a 180° field of view. The hallway between two walls 1012 may comprise a ball 1008 and a box 1010 to be utilized by the robot 102 as salient objects used to recreate motion of the robot using images from the sensor 302. Additionally, the two objects 1008 and 1010 may have been previously localized during prior navigation through the hallway. Accordingly, the robot 102 may localize itself at its initial position illustrated using measurement beams 1006 to determine its distance to the objects 1008 and 1010.

Figure 10B:
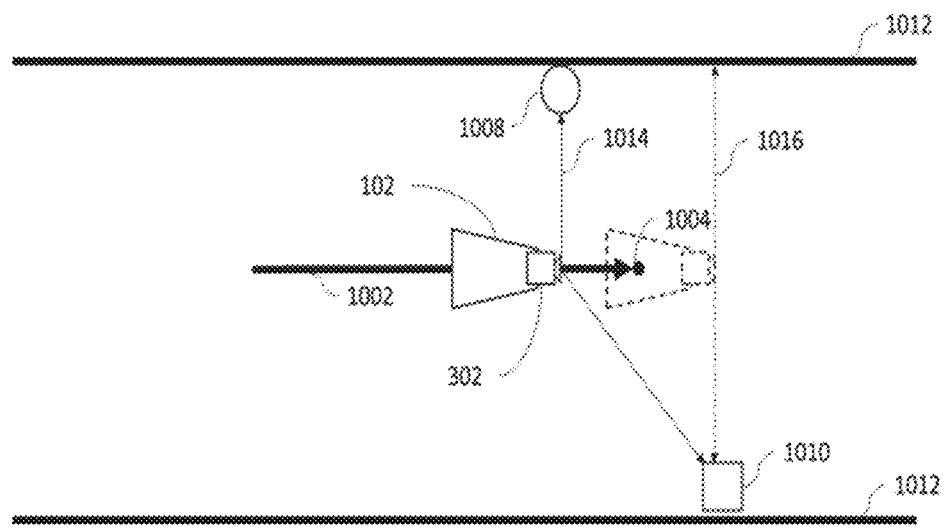

Next, in FIG. 10B, the robot 102 attempts to navigate to the point 1004, according to the exemplary embodiment. During navigation along the route 1002, the robot 102 may experience wheel slippage, wherein one or more wheels may turn without moving the robot 102 (i.e., slip). Based on data from an odometer alone and due to the wheel slippage, the robot 102 may localize itself at position 1004. However, the robot 102 may utilize measurement beams 1014 and 1016 to localize the ball 1008 and box 1010, respectively, at relative positions illustrated. The relative positions of the ball 1008 and box 1010, measured by beams 1014 and 1016 at the current position of the robot, may differ from an expected measurement 1018 of the ball 1008 and box 1010 at the point 1004. That is, at the point 1004, the robot 102 may expect to not observe or detect the ball 1008 and may observe a portion of the box 1010. Accordingly, a controller 118 of the robot 102 may utilize method 600 to determine an actual position and motion of the robot 102 based on a first image captured using measurements 1006 illustrated in FIG. 10A, and a second image captured using measurements 1014 and 1016 illustrated in FIG. 10B. Upon determining the actual motion of the robot 102, the robot 102 may localize itself at the position illustrated in FIG. 10B with improved accuracy. It is appreciated that data from a plurality of other sensor units 114 may be additionally utilized to verify a pose of the sensor 302. This data comprises negligible extrinsic biases in accordance with method 900, illustrated in FIG. 9 above, such that the robot 102 may utilize method 600 to accurately localize itself.

Advantageously, the use of laser and imaging odometry may further enhance localization capabilities of a robot 102, as data from a sensor 302 may be utilized to verify odometry data such that false positives caused by, for example, wheel slippage may be accounted for and corrected. Additionally, providing additional systems and methods for localization of a robot 102 may further enhance safety of operation of the robot 102 within complex environments, as poor localization of the robot 102 may cause subsequent portions of the route 1002 to be navigated incorrectly, thereby causing potential damage to the robot 102, nearby objects, and/or people.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various exemplary embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art of practicing the claimed disclosure, from a study of the drawings, the disclosure and the appended claims.

It should be noted that the use of particular terminology, when describing certain features or aspects of the disclosure, should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open-ended as opposed to limiting. As examples of the foregoing, the term "including" should be read to mean "including, without limitation," "including, but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "such as" should be interpreted as "such as, without limitation"; the term 'includes" should be interpreted as "includes but is not limited to;" the term "example" is used to provide exemplary instances of the item in discussion, not an exhaustive or limiting list thereof, and should be interpreted as "example, but without limitation"; adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or determined values, conditions, thresholds, measurements, and the like.

What is claimed is:

1. A method for determining a pose of a sensor of a robot, comprising:
   generating, via a controller configured to execute computer readable instructions, a composite image including overlaying of a first image and a second image captured by the sensor of the robot at different time intervals, the first image including a plurality of pixels representing an object at a first location, and the second image including a plurality of pixels representing the object at a different second location;
   determining, via the controller, a first motion of the robot based on a discrepancy between the first and second images by evaluating at least one depth disparity measurement and at least one spatial disparity measurement of the object represented in the first and second images;
   determining, via the controller, a second motion of the robot based on odometry data from one or more proprioceptive sensor of the robot;
   determining, via the controller, a most probable pose of the sensor based at least in part on a plurality of possible poses of the sensor and a continuous distribution function of the plurality of possible poses by applying a maximum a posteriori estimation, wherein the continuous distribution function of the plurality of possible poses comprises a set of priors for the maximum a posteriori estimation, wherein each of the plurality of possible poses is determined based on a respective discrepancy of a plurality of discrepancies between the first motion and the second motion, and wherein the continuous distribution function of the plurality of possible poses is measured over a period of time beginning prior to the first motion and the second motion of the robot; and
   localizing, via the controller, the object on a computer readable map based at least in part on the most probable pose of the sensor.

2. The method of claim 1, further comprising:
   determining, via the controller, discrepancy between the first and second images by translating and rotating the second image such that the translated and rotated second image matches the first image; and
   determining, via the controller, the change in pose of the sensor based on the translations and rotations performed on the second image.

3. The method of claim 2, wherein the translating and rotating of the second image is performed on a point cloud representation of the second image to match a point cloud representation of the first image.

4. The method of claim 2, further comprising:
   localizing, via the controller, the robot by utilizing the translations and rotations performed on the second image to determine a change in position and orientation of the sensor between a first time and a second time corresponding to a change in position of the robot.

5. The method of claim 1, wherein
   the sensor is configured to measure at least a distance parameter of objects within a visual scene, the sensor is positioned on the robot in a fixed pose, and
   the pixels of the first image and the second image are encoded with the distance parameter.

6. The method of claim 1, further comprising:
   navigating the robot along a third motion on the computer readable map based at least in part on the most probable pose of the sensor.

7. A non-transitory computer readable storage medium comprising a plurality of computer readable instructions stored thereon, that when executed by a controller, configure the controller to
   generate a composite image including overlaying of a first image and a second image captured by a sensor of a robot at different time intervals, the first image including a plurality of pixels representing an object at a first location, and the second image including a plurality of pixels representing the object at a different second location;
   determine a first motion of the robot based on a discrepancy between the first and second images by evaluating at least one depth disparity measurement and spatial disparity measurement of the object represented in the first and second images;
   determine a second motion of the robot based on odometry data from one or more proprioceptive sensor of the robot;
   determine a most probable pose of the sensor based at least in part on a plurality of possible poses of the sensor and a continuous distribution function of the plurality of possible poses by applying a maximum a posteriori estimation, wherein the continuous distribution function of the plurality of possible poses comprises a set of priors for the maximum a posteriori estimation, wherein each of the plurality of possible poses is determined based on a respective discrepancy of a plurality of discrepancies between the first motion and the second motion, and wherein the continuous distribution function of the plurality of possible poses is measured over a period of time beginning prior to the first motion and the second motion of the robot; and
   localize the object on a computer readable map based at least in part on the most probable pose of the sensor.

8. The non-transitory computer readable storage medium of claim 7, wherein the controller is further configurable to execute the computer readable instructions to
   determine discrepancy between the first and second images by translating and rotating the second image such that the translated and rotated second image matches the first image, and determine the change in pose of the sensor based on the translations and rotations performed on the second image.

9. The non-transitory computer readable storage medium of claim 8, wherein the translating and rotating of the second image is performed on a point cloud representation of the second image to match a point cloud representation of the first image.

10. The non-transitory computer readable storage medium of claim 8, wherein the controller is further configurable to execute the computer readable instructions to
localize the robot by utilizing the translations and rotations performed on the second image to determine a change in position and orientation of the sensor between a first time and a second time corresponding to a change in position of the robot.

11. The non-transitory computer readable storage medium of claim 7, wherein
the sensor is configured to measure at least a distance parameter of objects within a visual scene and positioned on the robot in a fixed pose, and
the pixels of the first image and the second image are encoded with the distance parameter.

12. A system for determining a pose of a sensor of a robot, comprising:
a memory having computer readable instructions stored thereon; and
a controller configurable to execute the computer readable instructions to
generate a composite image including overlaying of a first image and a second image captured by the sensor of the robot at different time intervals, the first image including a plurality of pixels representing an object at a first location, and the second image including a plurality of pixels representing the object at a different second location,
determine a first motion of the robot based on a discrepancy between the first and second images by evaluating depth disparity measurement and spatial disparity measurement of the object represented in the first and second images,
determine a second motion of the robot based on odometry data from one or more proprioceptive sensor of the robot;
a most probable pose of the sensor based at least in part on a plurality of possible poses of the sensor and a continuous distribution function of the plurality of possible poses by applying a maximum a posteriori estimation, wherein the continuous distribution function of the plurality of possible poses comprises a set of priors for the maximum a posteriori estimation, wherein each of the plurality of possible poses is determined based on a respective discrepancy of a plurality of discrepancies between the first motion and the second motion, and wherein the continuous distribution function of the plurality of possible poses is measured over a period of time beginning prior to the first motion and the second motion of the robot; and
localize the object on a computer readable map based at least in part on the most probable pose of the sensor.

13. The system of claim 12, wherein the controller is further configurable to execute the computer readable instructions to
determine discrepancy between the first and second images by translating and rotating the second image such that the translated and rotated second image matches the first image, and
determine the change in pose of the sensor based on the translations and rotations performed on the second image.

14. The system of claim 13, wherein the translating and rotating of the second image is performed on a point cloud representation of the second image to match a point cloud representation of the first image.

15. The system of claim 13, wherein the controller is further configurable to
localize the robot by utilizing the translations and rotations performed on the second image to determine a change in position and orientation of the sensor between a first time and a second time corresponding to a change in position of the robot.

16. The robotic system of claim 12, wherein
the sensor is configured to measure at least a distance parameter of objects within a visual scene, the sensor is positioned on the robot in a fixed pose, and
the pixels of the first image and the second image are encoded with the distance parameter.

* * * * *